(12) United States Patent
Miller et al.

(10) Patent No.: US 6,684,262 B1
(45) Date of Patent: Jan. 27, 2004

(54) METHOD AND SYSTEM FOR CONTROLLING PERIPHERAL DEVICE INTERFACE BEHAVIOR USING THREAD REGISTRATION

(75) Inventors: Wesley Joseph Miller, Fuquay-Varina, NC (US); Kenneth Joseph Shiring, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 09/696,278

(22) Filed: Oct. 25, 2000

(51) Int. Cl.[7] .................................................. G06F 3/00
(52) U.S. Cl. ............................. 710/8; 710/10; 710/16; 709/223
(58) Field of Search ............................... 710/8, 10, 16; 709/203, 223

(56) References Cited

U.S. PATENT DOCUMENTS

| | | | |
|---|---|---|---|
| 5,421,014 A | * 5/1995 | Bucher | 709/100 |
| 5,442,758 A | 8/1995 | Slingwine et al. | |
| 5,608,893 A | 3/1997 | Slingwine et al. | |
| 5,732,269 A | 3/1998 | Compton et al. | |
| 5,925,098 A | 7/1999 | Freund et al. | |
| 5,928,323 A | 7/1999 | Gosling et al. | |
| 5,968,167 A | 10/1999 | Whittaker et al. | |
| 6,128,745 A | * 10/2000 | Anderson et al. | 713/323 |
| 6,360,220 B1 | * 3/2002 | Forin | 707/8 |
| 6,418,442 B1 | * 7/2002 | Dwyer, III | 707/100 |
| 6,463,480 B2 | * 10/2002 | Kikuchi et al. | 709/315 |
| 6,542,920 B1 | * 4/2003 | Belkin et al. | 709/104 |

OTHER PUBLICATIONS

"Out–Of–Bank Parameter Descriptions for Dynamic Calling Sequence Description," IBM Technical Disclosure Bulletin, vol. 35, No. 4B, Sep. 1992, pp. 235–236.

* cited by examiner

Primary Examiner—Jeffrey Gaffin
Assistant Examiner—Eron J Sorrell
(74) Attorney, Agent, or Firm—Bracewell & Patterson

(57) ABSTRACT

A method and system for controlling peripheral device interface behavior based on thread type registration provides simplicity and code reusability within a diagnostics program. When the diagnostics program is initialized, it constructs threads to test or service each of multiple peripheral devices. By registering a thread type for at least some of the threads, the type of adapter can be determined during thread execution via a table look-up. This allows multiple layers of interface code to be reused for different physical adapter interfaces.

18 Claims, 3 Drawing Sheets

METHOD AND SYSTEM FOR CONTROLLING PERIPHERAL DEVICE INTERFACE BEHAVIOR USING THREAD REGISTRATION

BACKGROUND OF THE INVENTION

1. Technical Field

The present invention relates in general to computer operating systems, diagnostics software and device drivers. In particular, this invention relates to a method and system for controlling device interface behavior based on registering a thread type when a device service thread is constructed.

2. Description of the Related Art

Software designed to communicate with peripheral devices within a computer system typically is unique to each peripheral device. Due to variations in the hardware, it is often impractical to design a single program or device driver that can communicate with more than one peripheral device, unless the peripheral devices are very similar to each other. Additionally, peripheral device oriented software is often developed for an initial product design and when a new design is produced later, it is difficult to modify the software to accommodate the new architecture, which can be completely incompatible with existing software.

Another feature of peripheral device oriented software is that it tends to have a high degree of layering. Calls are deeply nested, especially when implemented in object oriented programming languages, in which methods are inherited from more generic objects and modified in the more specific objects that implement hardware interfaces.

At the bottom of "deep" function calls or method "stacks", the hardware interface routines perform the actual communication with the peripheral device. When a given peripheral device stack must interface with more than one peripheral device, and the peripheral devices are of greatly different interface types, information that is needed for each of the different peripheral devices must still be made available to the lowest level interface routines.

One method for passing this information is to add all the needed information to the parameter lists for the function calls. Parameter passing leads to long parameter lists containing information that may be unneeded for a specific peripheral device. However, parameter passing also wastes stack space, as the information may be stored on the stack for each level of call, depending on the level of optimization used by the compiler.

An alternative technique is passing a pointer to a structure that contains most of the information needed by the peripheral device interface routines. Structure based data passing requires careful attention to the structure form and data types. Misinterpretation of the data may occur if the structure types and data alignment are not correct. An error may require extra debugging effort.

A second alternative is the use of global data. However, globalizing data requires control of the synchronization of routines that modify and read the data, as the data is shared by all processes and all threads for which the data is visible.

Therefore, it would be desirable to provide a method for passing data to low level peripheral device interface routines without parameter passing, structure maintenance, or globalization of the data.

SUMMARY OF THE INVENTION

The objectives of providing a method and system for passing information to a low level peripheral device interface is accomplished in a method and system for controlling peripheral device interface behavior using thread registration.

The method constructs a thread for servicing the peripheral device and registers a thread identifier associated with the thread and the peripheral device information associated with the peripheral device in a thread registry. Then communication is initiated with the peripheral device from the thread, and the thread retrieves the peripheral device information by obtaining a current thread identifier and accessing the thread registry using the current thread identifier. The thread then communicates with the peripheral device using the retrieved peripheral device information.

The method may be further embodied in a computer program product adapted for use with a computer system having program instructions for carrying out the steps of the method.

The above-mentioned objectives can also be achieved in a computer system that includes multiple peripheral devices for which diagnostic or control functions are required, means for constructing a thread for servicing one of the peripheral devices, means for communicating with the peripheral device using peripheral device information. The construction means registers a thread identifier associated with the thread and peripheral device information associated with the peripheral device in a thread registry. The communication means retrieves the appropriate peripheral device information by obtaining a current thread identifier, and using the current thread identifier to retrieve the peripheral device information. The communication means then communicates with the peripheral device using the retrieved peripheral device information.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
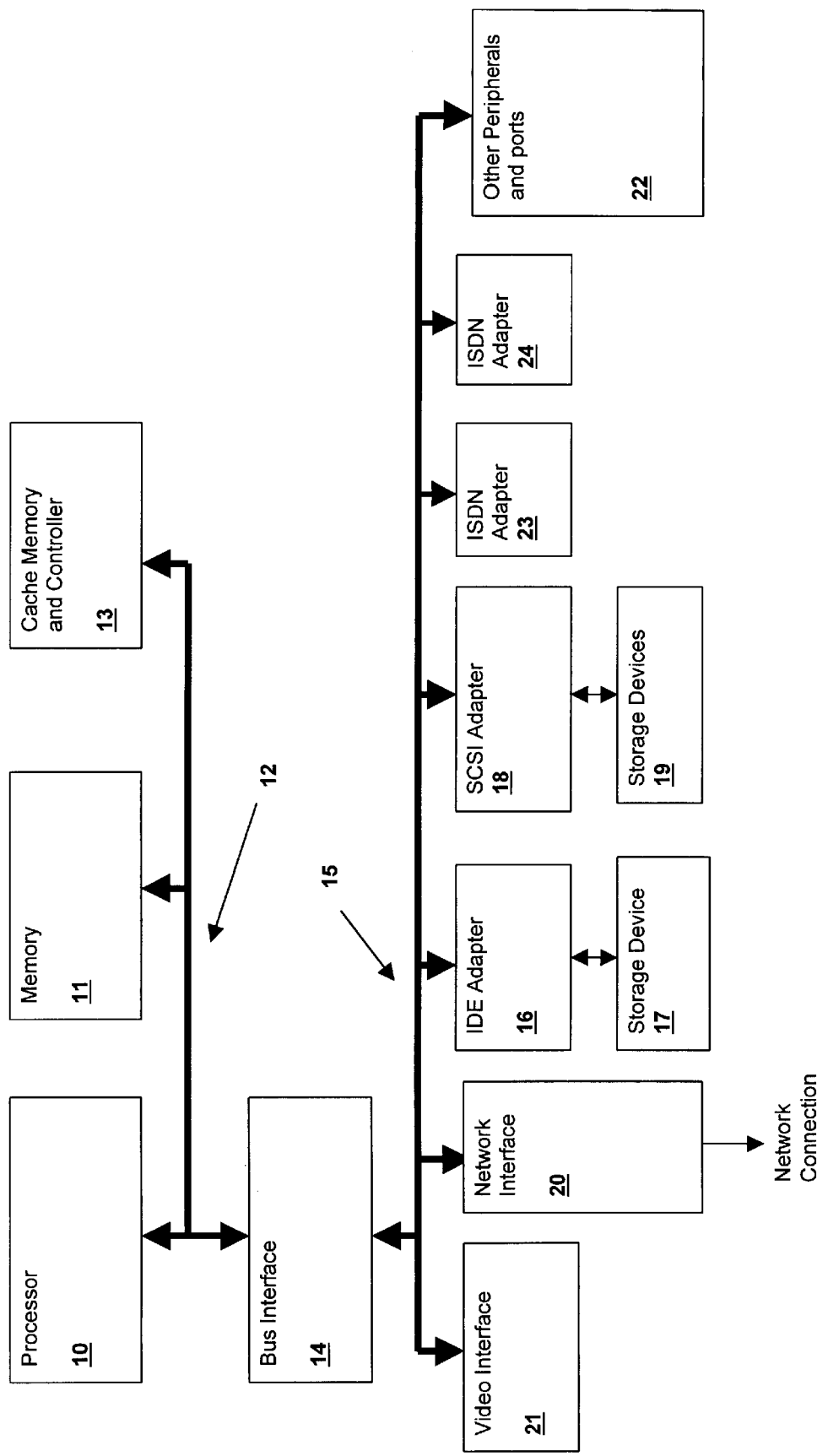
FIG. 1 is a block diagram of a computer system in which the present invention may be implemented.

With reference now to the figures and in particular with reference to FIG. 1, there is depicted a block diagram of a computer system in which the present invention can be implemented. As shown, a local bus 12 couples a processor 10 for executing program instructions with a memory 11 for storing value data and, program instructions. A cache memory and controller 13 are optionally supplied for storage of frequently accessed value data and program instructions. A bus interface 14 couples local bus 12 to a system bus 15. System bus 15 couples various peripheral components to bus interface 14, providing user interface and storage for the computer system.

In the illustrative embodiment of FIG. 1, several peripherals are coupled to system bus 15, including a video interface 21 for interfacing a user display, a network interface 20 for connecting the computer system to a network, and an Integrated Device Electronics (IDE) adapter 16 and a Small Computer Systems Interface (SCSI) adapter 18 for coupling storage devices 17 and 19, respectively. Integrated Services Digitail Network (ISDN) adapter 23 and ISDN adapter 24 are coupled to system bus 15 to provide an interface to ISDN networks. In this exemplary embodiment, ISDN adapter 23 and ISDN adapter 24 have interfaces that require an interface routine within a diagnostics program or a device driver have different hardware device information in order to communicate. For example, ISDN adapter A 23 may be a memory-mapped peripheral device, where commands and data are written to memory-mapped locations that are occupied by adapter 23, instead of random access memory (RAM) or read-only memory (ROM). Adapter 24 may be an I/O (Input/Output) mapped peripheral device, thus the interface program must use an I/O port address. Other differences include ISDN adapter 23 and ISDN adapter 24 using different protocols.

The present invention makes information necessary for communication with ISDN adapter 23 and ISDN adapter 24 available to the level of program code that differs for each of the adapter implementations, so that the code above that level can be commonly used for both adapters. The present invention allows the peripheral device information to be available at the lowest common level without passing the information as parameters on the stack through each function call, providing the data as global, or passing a pointer to a structure containing the peripheral device information.

Figure 2:
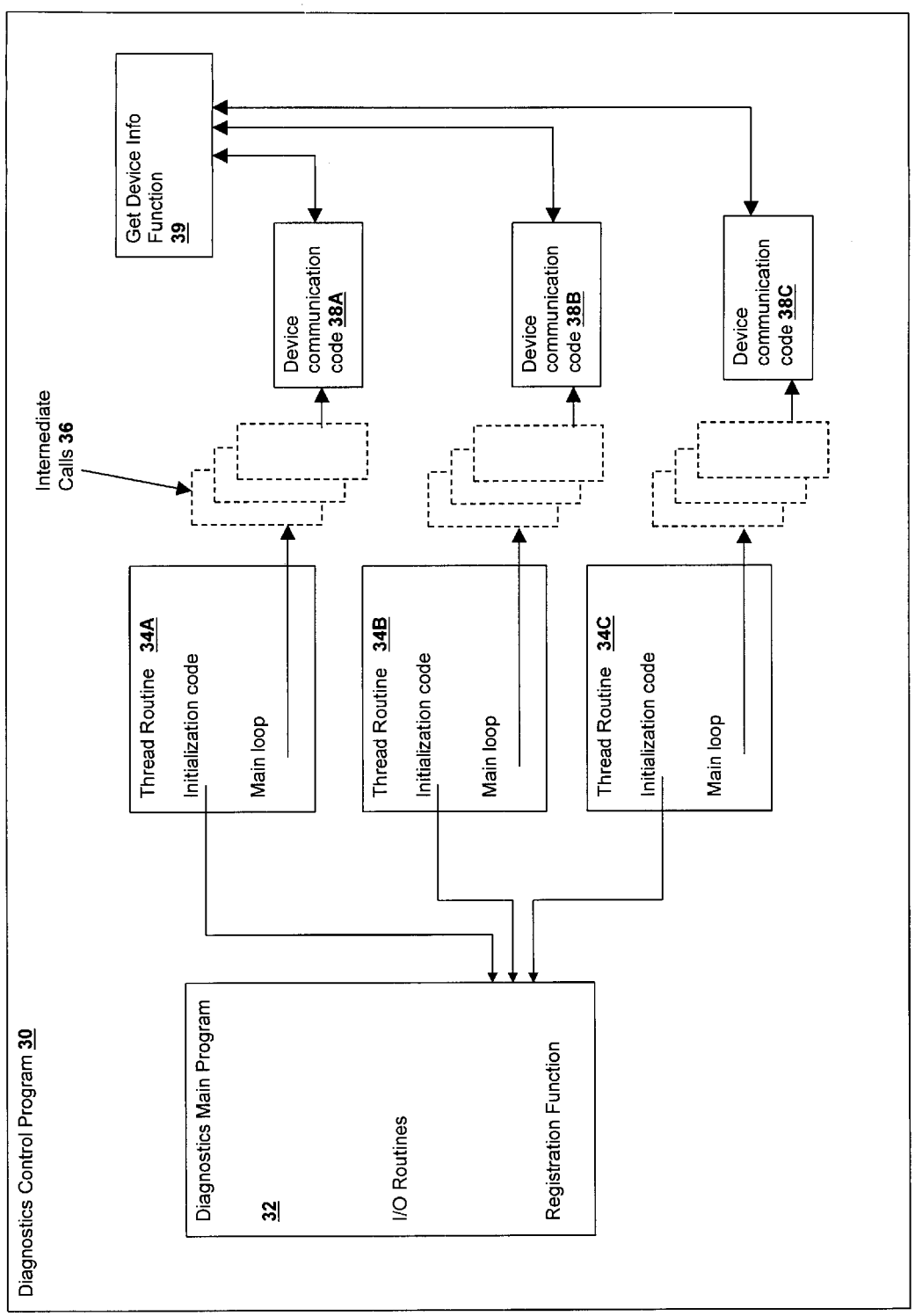
FIG. 2 is a block diagram depicting the relationship between main initialization code and peripheral device interface code, in accordance with a preferred embodiment of the present invention.

Referring now to FIG. 2, there is shown a block diagram of the organization of a diagnostics control program 30 for testing ISDN adapter 23 and ISDN adapter 24. A diagnostics main program 32 contains a registration function and common thread registry routines that can be used by instances of a thread handler for a thread constructed to service a specific hardware peripheral device. Diagnostics main program 32 constructs at least one thread to service each peripheral device. The thread identifier provided at thread creation is placed in a structure such as the following:

```
struct ThreadData {
    unsigned long ThreadID;
    DEVICE_DATA* pDeviceData;
};
```

ThreadData.ThreadID is an unique thread identifier received at thread construction time and ThreadData.pDeviceData is a pointer to a structure containing peripheral device specific data that is needed by the low level peripheral device interface routines. The structure pointed to by ThreadData.pDeviceData is initialized by diagnostics main program 32 to contain the appropriate values for the peripheral device that is serviced by the thread identified by ThreadData.ThreadID. DEVICE_DATA could be defined as a union in order to conserve storage space for differing adapter data requirements. The data could alternatively be placed directly in the ThreadData structure. The ThreadData structures can be collected in a linked list as the threads are constructed for each peripheral device, or a simple tabular array of ThreadData structures can be maintained. As long as the peripheral device information can be retrieved knowing the ThreadData.ThreadID value, the registration scheme will perform as required.

When the threads for the peripheral devices are constructed, thread entry points are called by the operating system. The thread handler instances, thread routines 34A, 34B, and 34C contain main loops that perform diagnostic tests. The main loops make calls to other functions in the thread handler code constituting intermediate calls 36, until peripheral device communication code 38A, 38B, and 38C is reached. Peripheral device communication code instances 38A, 38B, and 38C perform low level interface functions for diagnostics control program 30.

Each of the peripheral device communication code instances 38A, 38B, and 38C can call a get device information function 39 that retrieves the peripheral device information based on the calling thread. Thus, peripheral device communication code instance 38A will result in retrieval of a different peripheral device information structure for that peripheral device communication code instance 38B, resulting in the selection of appropriate information and perhaps behavior selected by testing for certain values within the structure. For example, one of the structure members could be a enumerated value specifying an adapter type, and appropriate interface behavior could be selected by testing this value in a switch statement. The get device information function 39 determines which information to retrieve by getting the thread identifier of the thread that is calling the get device information function 39. This can be accomplished by calling pthread_self( ) within the POSIX operating system environment (POSIX is a language standardized by the Institute of Electrical and Electronic Engineers (IEEE) Portable Application Standards Committee) or GetCurrentThread( ) in the Windows operating system environment (Windows is a product of Microsoft Corporation). The linked list or other data structure containing information to access the individual thread identifiers and associated peripheral device information previously stored by diagnostics main program 32, is walked by get device information function 39 to obtain the appropriate peripheral device information.

The following examples show the benefits and structure of the present invention, as applied to a peripheral device access.

```
typedef unsigned long ULONG;
typedef unsi9ned char UCHAR;
typedef UCHAR BOOLEAN;
// The following routine tests for the adapter type
// I/O or memory mapped and reads a value from the
// adapter
Check_For_Presence     (ULONG IoAddress, ULONG Interrupt,
                        ULONG MemAddress, UCHAR type)
{
   if(type == DEVICE_TYPE_IOMAPPED)
   {
     Read_Io_Port ( IoAddress );
   }
   else // DEVICE_TYPE_MEMMAPPED
   {
```

-continued

```
    Read_Mem Location( MemAddress );
    }
}
// This is the top level test routine
BOOLEAN Test_Adapter    (TEST_RESULTS &Result,
                         ULONG IoAddress, ULONG Interrupt,
                         ULONG MemAddress, UCHAR type)
{
    Check_For_Presence(IoAddress, Interrupt,
                                   MemAddress, type);
    ...
}
```

Test_Adapter( ) is an exemplary test routine and Check_For_Presence( ) is a function called by Test_Adapter( ) to read the hardware and determine if the adapter is present. The implementations shown above are illustrative and do not contain all the functionality necessary for operation.

The disadvantage of the above "C" code is that the parameter lists contain all of the values that might be needed for all types of adapters. All of the parameters are passed through Check_For_Presence( ) to Read_Mem_Location( ) or Read_Io_Location( ). By using the method of the present invention, the parameter lists can be shortened, as in the following example:

```
// this structure defines the linked-list entry type
struct LISTENTRY
{
THREAD_DATA *pData;
LISTENTRY *pNext;
};
// here is the top of the list
LISTENTRY ThreadEntryList;
ReadAdapter ()
}
LISTENTRY *pEntry;
THREADID CurrentThreadId;
CurrentThreadId = pthread_self();
DEVICE_DATA *pDeviceData;
// ThreadEntryList is a global first list entry
pEntry = &ThreadEntryList;
while( pEntry )
{
if ( pEntry->pData->ThreadId==CurrentThreadId )
{
pDeviceData = pEntry->pData->pDeviceData;
if (pDeviceData->type==DEVICE_TYPE_IOMAPPED)
{
Read_Io_Port(pDeviceDAta->IoAddress);
}
else // DEVICE_TYPE_MEMMAPPED
{
Read_Mem_Location(pDeviceData->MemAddress);
}
pEntry=pEntry->pNext;
}
}
Check_For_Presence()
{
Read_Adapter();
}
BOOLEAN Test_Adapter( TEST_RESULTS &Result )
{
Check_For_Presence();
...
}
```

In the above example, ReadAdapter( ) and Check_For_Presence need no adapter-specific arguments. Based on the current thread information obtained from pthread_self( ), the linked list is traversed until a match with the thread identifier is found. Once the match is found, the device-specific information contained in the structure can be accessed to determine adapter type and the address information used for access.

Before the thread handler routines illustrated above may be used, the linked list must be initialized. For example:

```
void main()
{
int i;
THREADID ThreadId;
LISTENTRY *pListEntry = &ThreadEntryList;
for( i=0; i < NumberOfAdapters; i++)
{
// AdapterData is a static array containing
// the adapter data for all of the adapters
pListEntry->pData->ThreadId=
CreateThreadForAdapter ();
pListEntry->pData->pDeviceData=&AdapterData [i];
pListEntry->pNext = malloc (sizeof (LISTENTRY));
pListEntry = pListEntry->pNext;
}
}
```

The above routine builds a list of THREAD_DATA structures containing DEVICE_DATA and THREADID values that can be accessed by the thread handler routines illustrated previously. Once the peripheral device data is associated with a thread identifier, the peripheral device data can be accessed at thread execution time by knowing the thread identifier. Peripheral device data can be any information associated with the peripheral device, such as peripheral device type, I/O address, interrupts, and other system information. Peripheral device data may also contain peripheral device-specific information such as command types, buffer sizes, buffer quantities, etc.

Figure 3B:
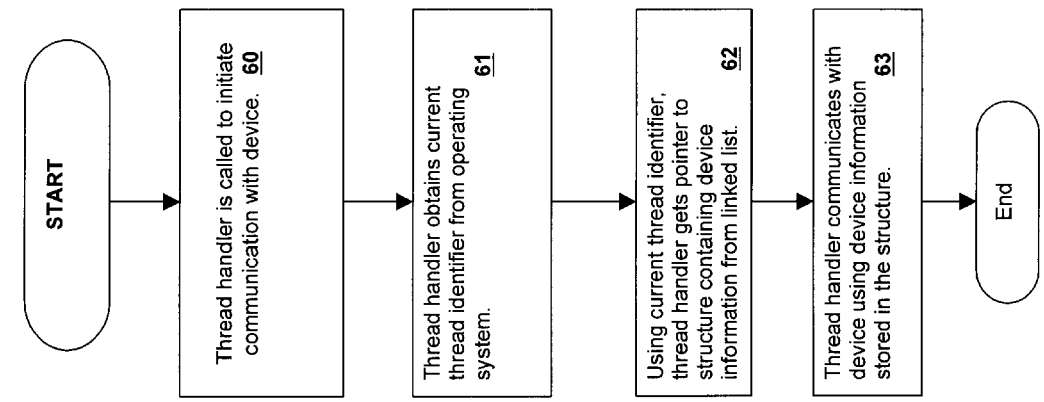
FIG. 3B is a flowchart depicting a thread handler portion of a method for controlling peripheral device interface behavior using thread registration, in accordance with a preferred embodiment of the present invention.
Figure 3A:
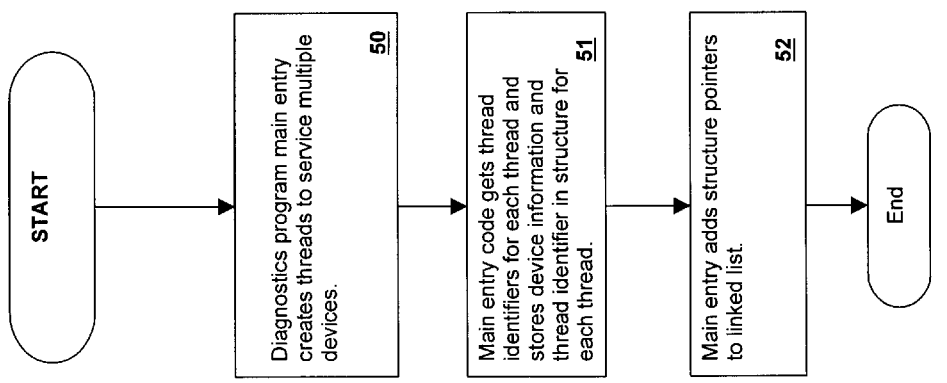
FIG. 3A is a flowchart depicting a main entry portion of a method for controlling peripheral device interface behavior using thread registration, in accordance with a preferred embodiment of the present invention.

Referring now to FIG. 3A, there is illustrated a flow diagram of a main entry portion of a method for controlling peripheral device interface behavior using thread registration, in accordance with a preferred embodiment of the present invention. Diagnostics program main entry constructs threads to service multiple peripheral devices (step 50). Then, the main entry code gets thread identifiers for each thread. The thread identifiers are generally returned by the application program interface (API) that constructs the threads. The main entry code stores the thread identifier and peripheral device specific information in a structure (step 51). Last, the main entry code adds the structure pointer to the linked list that forms the thread registration access mechanism (step 52). Once the main program initialization is complete, the individual threads may obtain the peripheral device specific information when needed.

Referring now to FIG. 3B, there is shown a flow diagram of a thread handler portion of a method for controlling peripheral device interface behavior using thread registration, in accordance with a preferred embodiment of the present invention. The thread handler code is called to initiate communication with the peripheral device (step 60). The thread handler code then obtains the current thread identifier from the operating system (step 61). Using the current thread identifier, the thread handler gets the pointer to the structure containing the peripheral device information for that thread from the linked list entry constructd by the main diagnostics program code (step 62). Finally, the thread handler communicates with the peripheral device using the peripheral device information pointed to by the retrieved pointer (step 63).

Although this specification refers to diagnostics programs and physical devices such as ISDN adapters, this should not be construed in a limiting sense. For example, a device driver supporting run-time operation of a physical device may be improved by using the method of the present invention.

While the invention has been particularly shown and described with reference to a preferred embodiment, it will be understood by those skilled in the art that various changes in form and detail may be made therein without departing from the spirit and scope of the invention.

What is claimed is:

1. A method of operating a peripheral device within a computer system, said method comprising:

constructing a thread for servicing said peripheral device;

determining whether or not said peripheral device is of a type for which thread registration is desired;

in response to a determination that said peripheral device is of a type for which thread registration is desired, registering a thread identifier of said thread and peripheral device information associated with said peripheral device in a thread registry;

in response to a communication initiated from said thread, retrieving said peripheral device information by obtaining a current thread identifier and accessing said thread registry using said current thread identifier; and communicating with said peripheral device using said retrieved peripheral device information.

2. The method according to claim 1, wherein said thread registry is a linked list containing pointers to information structures, wherein each of said information structures contains a thread identifier member, and wherein said registering further includes storing said thread identifier in a thread identifier member of one of said information structures.

3. The method according to claim 1, wherein said communicating further includes performing diagnostic functions associated with said peripheral device.

4. The method according to claim 3, wherein said peripheral device is an Integrated Services Digital Network (ISDN) adapter.

5. The method according to claim 1, wherein said communicating further includes controlling the operation of said peripheral device for an operating system.

6. The method according to claim 1, further comprising determining whether or not said of retrieving said peripheral device information succeeds in retrieving said peripheral device information, and wherein said communicating with said peripheral device is performed using an alternate peripheral device information in response to determining that said retrieving did not succeed.

7. A computer program product for operating a peripheral device within a computer system, said computer program product comprising:

program code means for constructing a thread for servicing said peripheral device;

program code means for determining whether or not said peripheral device is of a type for which thread registration is desired;

program code means for registering a thread identifier of said thread and peripheral device information associated with said peripheral device in a thread registry, in response to a determination that said peripheral device is of a type for which thread registration is desired;

program code means for retrieving said peripheral device information by obtaining a current thread identifier and accessing said thread registry using said current thread identifier, in response to a communication initiated from said thread; and program code means for communicating with said peripheral device using said retrieved peripheral device information.

8. The computer program product according to claim 7, wherein said thread registry is a linked list containing pointers to information structures, wherein each of said information structures contains a thread identifier member, and wherein said program means for registering further includes program code means for storing said thread identifier in a thread identifier member of one of said information structures.

9. The computer program product according to claim 7, wherein said program code means for communicating further include computer code means for performing diagnostic functions associated with said peripheral device.

10. The computer program product in accordance with according to claim 9, wherein said peripheral device is an Integrated Services Digital Network (ISDN) adapter.

11. The computer program product according to claim 7, wherein said program code means for communicating further include program code means for controlling the operation of said peripheral device for an operating system.

12. The computer program product according to claim 7, further comprising program code means for determining whether or not said program code means for retrieving said peripheral device information succeeds in retrieving said peripheral device information, and wherein said program code means for communicating with said peripheral device communicates using an alternate peripheral device information in response to a determination that said program code means for retrieving said peripheral device information did not succeed.

13. A computer system comprising:

a plurality of peripheral devices for which diagnostic or control functions are required;

means for constructing a thread for servicing a given one of said plurality of peripheral devices, wherein said constructing means registers a thread identifier of said thread and peripheral device information associated with said peripheral device in a thread registry, wherein said constructing means determines whether or not said peripheral device is of a type for which thread registration is desired, wherein said constructing means registers said thread in response to a determination that said peripheral device is of a type for which thread registration is desired; and means for communicating with said given peripheral device using said peripheral device information, wherein thread handler retrieves said peripheral device information by obtaining a current thread identifier and accesses said thread registry using said current thread identifier.

14. The computer system according to claim 13, wherein said thread registry is a linked list containing pointers to information structures, wherein each of said information structures contains a thread identifier member, and wherein said constructing means registers said thread identifier by storing said thread identifier in a thread identifier member of one of said information structures.

15. The computer system according to claim 13, wherein said communicating means further performs diagnostic functions associated with said peripheral device.

16. The computer system in accordance with according to claim 15, wherein said peripheral device is an Integrated Services Digital Network (ISDN) adapter.

17. The computer system according to claim 13, wherein said communicating means controls the operation of said peripheral device for an operating system.

18. The computer system according to claim 13, wherein said communicating means communicates with said peripheral device using an alternate peripheral device information in response to a determination that said communicating means cannot retrieve said peripheral device information.

\* \* \* \* \*